United States Patent [19]

Biscaro

[11] 4,218,415
[45] Aug. 19, 1980

[54] MANUFACTURE OF FOAM COATED ROD-LIKE ELEMENTS PARTICULARLY FOR SUPPORTING POT-GROWN PLANTS IN GENERAL

[75] Inventor: Elia Biscaro, Milan, Italy

[73] Assignee: Botanik S.r.l., Bresso, Italy

[21] Appl. No.: 868,351

[22] Filed: Jan. 10, 1978

Related U.S. Application Data

[63] Continuation-in-part of Ser. No. 705,748, Jul. 15, 1976, abandoned.

[30] Foreign Application Priority Data

Jul. 21, 1975 [IT] Italy ................................ 25625 A/75

[51] Int. Cl.² ...................... B29D 27/04; A01G 17/04
[52] U.S. Cl. ......................................... 264/46.4; 47/47; 47/48.5; 249/91; 249/97; 264/46.9; 264/157; 264/273; 264/275; 264/277
[58] Field of Search .................... 264/46.7, 46.9, 46.4, 264/157, 297, 272, 273, 275; 47/47, 48.5; 426/91, 134, 100, 101, 102, 103; 249/91, 97

[56] References Cited

U.S. PATENT DOCUMENTS

| | | | |
|---|---|---|---|
| Re. 27,917 | 2/1974 | Jefferson et al. | 47/48.5 X |
| 125,632 | 4/1872 | Truax | 264/157 |
| 2,720,003 | 10/1955 | Harris et al. | 264/157 |
| 2,952,462 | 9/1960 | Planin | 47/48.5 X |
| 3,026,652 | 3/1962 | Helmerson et al. | 264/157 X |
| 3,188,771 | 6/1965 | Ballai | 47/47 |
| 3,325,881 | 6/1967 | Engelking | 264/277 X |
| 3,334,440 | 8/1967 | Choquette | 47/47 X |
| 3,683,960 | 8/1972 | Kirsch | 264/277 X |
| 3,740,024 | 6/1973 | Hellerich et al. | 47/47 X |
| 4,117,628 | 10/1978 | Smith | 47/47 |
| 4,143,105 | 3/1979 | Hentschel et al. | 264/53 X |

FOREIGN PATENT DOCUMENTS

| | | | |
|---|---|---|---|
| 2047251 | 3/1972 | Fed. Rep. of Germany | 47/48.5 |
| 1522503 | 4/1968 | France | 264/46.4 |
| 47-49186 | 12/1972 | Japan | 264/46.7 |
| 6706482 | 11/1967 | Netherlands | 264/46.4 |
| 1294269 | 10/1972 | United Kingdom | 47/47 |

Primary Examiner—Philip Anderson
Attorney, Agent, or Firm—Albert Josif; Guido Modiano

[57] ABSTRACT

Method of manufacture of foam coated rod-like elements particularly for supporting pot-grown plants in general comprising the step of arranging a plurality of elongated tubular members of plastic material in spaced parallel relationship to each other into a tank and casting synthetic foam forming chemicals into the tank. The foam forming chemicals are caused to expand within the tank up to a level higher than the uppermost tubular member. The tubular members are thereby embedded into the foam. After hardening of the foam from the formed foam block foam coated rod-like elements are cut out each containing embedded therein one tubular member.

3 Claims, 8 Drawing Figures

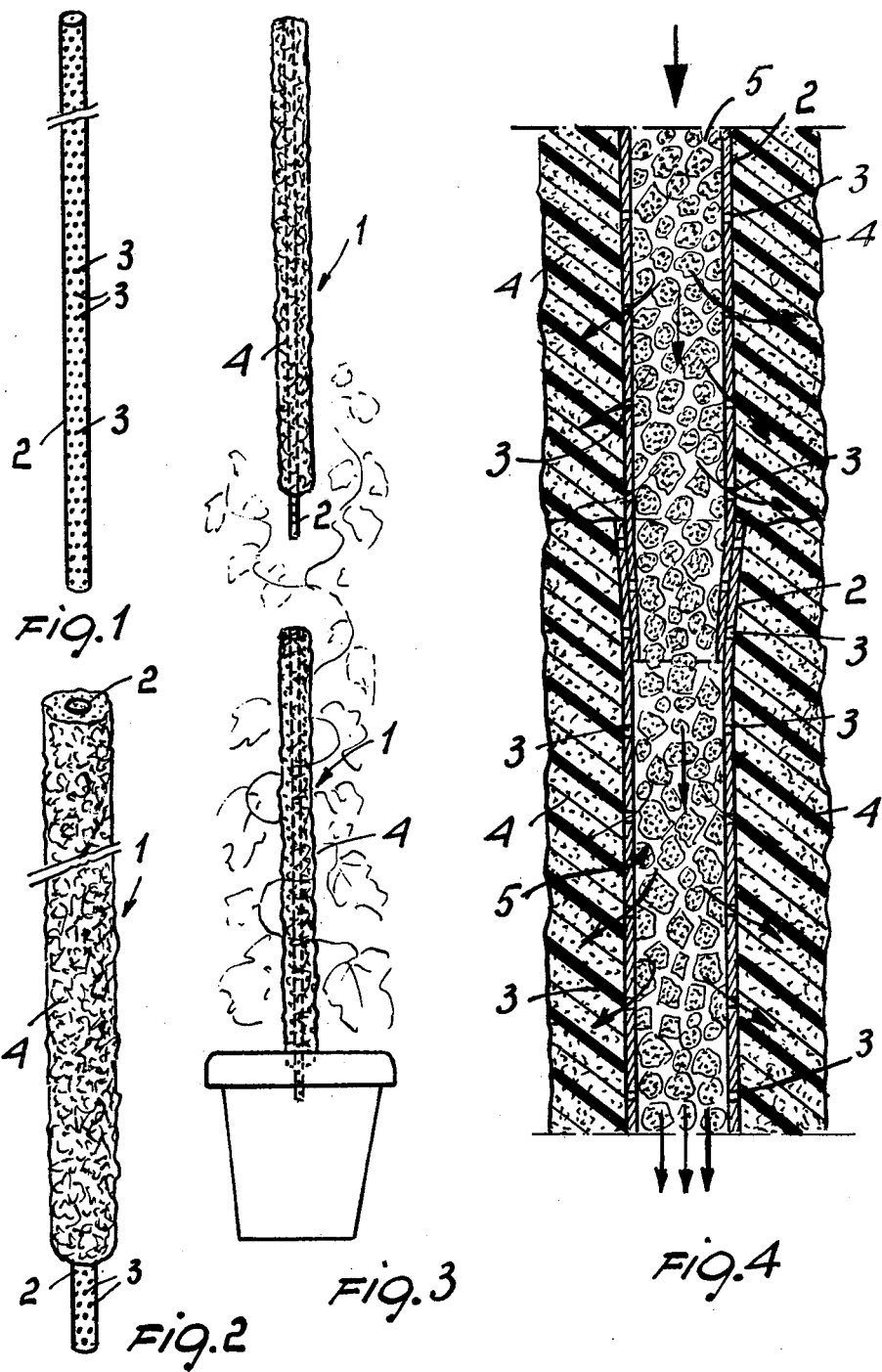

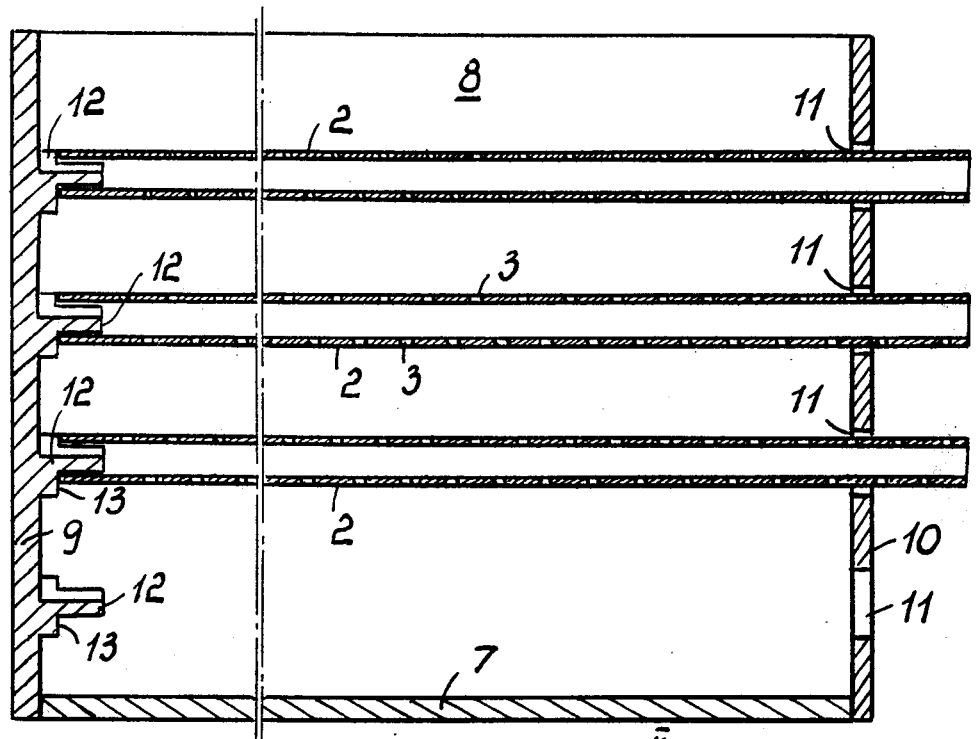
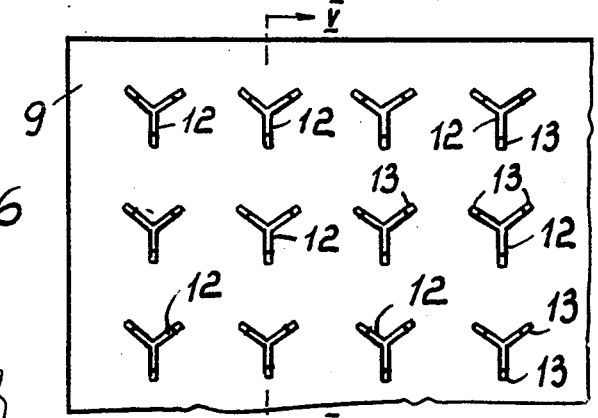
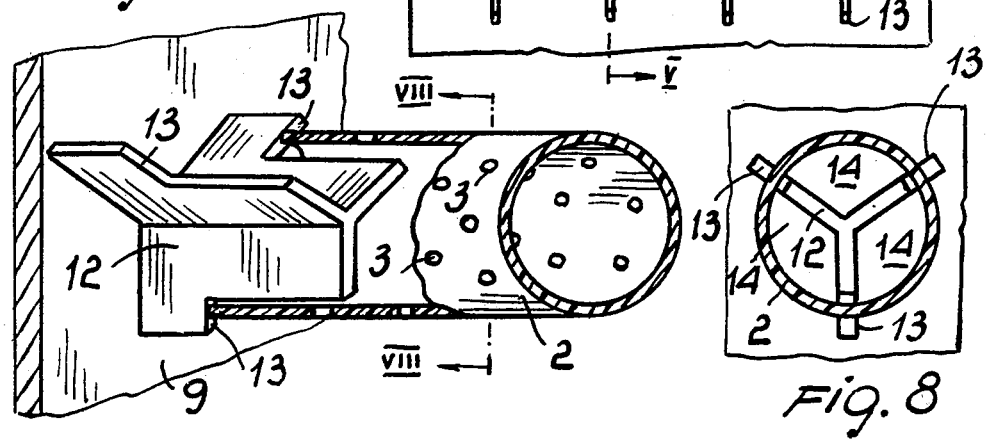

MANUFACTURE OF FOAM COATED ROD-LIKE ELEMENTS PARTICULARLY FOR SUPPORTING POT-GROWN PLANTS IN GENERAL

CROSS-REFERENCE TO RELATED APPLICATION

This is a continuation in part of application Ser. No. 705,748 filed July 15, 1976 now abandoned.

BACKGROUND OF THE INVENTION

This invention relates to the manufacture of foam coated rod-like elements, particularly for use in supporting pot-grown plants in general.

Generally, for supporting pot-grown plants, plastic material extruded tubes are currently utilized which are wrapped in natural moss, firmly tied to the tubes with a thread or wire length.

Furthermore, an accessory is also available for wetting the moss such that the plants, and especially those having aerial roots as well (e.g., potus-philodendron, etc.), may absorb moisture. Such an accesory is comprised of a plastic bottle which is secured to the top of the plant support and provided with an adjustable aperture with a valve and tube allowing the water to drip out, thus creating a water reserve supply.

The implementation of the cited support types poses currently some problems, since in many areas the collection of moss is forbidden, in order not to depauperate the natural vegetation reserves, and moreover, from investigations carried out, it appears that natural moss is growing scarcer, thereby the manufacturers of the cited supports are compelled to use straw wrappings, or even import layered moss.

These approaches, in addition to being scarcely convenient from the economical point of view, have failed to be at all times satisfactory; in fact, for example, the straw material, besides requiring in most cases a green colour dyeing process to simulate a moss covered stick, tends in time to rot away, thus losing its functionality.

Another noticeable shortcoming resides in that the water reserve supply accessories, besides being unpractical, contain rather limited amounts of water, thereby they have short duration limits and require frequent refilling.

An attempt has also be made to replace the natural moss with a spongy material wrapped around the rod-like element. However such spongy material did not adhere strongly enough onto the rod-like element, so that after a relatively short time the peeling thereof from the rod-like element occurred.

SUMMARY OF THE INVENTION

It is accordingly a primary object of this invention to obviate the prior art drawbacks by providing a rod-like element for supporting pot-grown plants, which while being quite functional, requires no addition of moss, the latter being, as mentioned above, difficult to find and of high cost.

It is another object of the invention to provide a rod-like supporting element which, without any addition of accessories, is capable of providing a good water reserve supply, thus ensuring a satisfactory water feeding duration.

It is a further object of this invention to provide a rod-like element for supporting pot-grown plants which may be easily manufactured from readily available materials, requires no costly or difficult processing, and which, moreover, is of such a low cost as to be highly competitive.

These and other objects, such as will become apparent hereinafter, are achieved according to the invention by a method of manufacture of rod-like elements particularly for supporting pot-grown plants in general, comprising the step of arranging a plurality of elongated tubular members of plastic material in spaced parallel relationship to each other into a tank, casting synthetic foam forming chemicals into said tank, leaving said foam forming chemicals to expand within said tank up to a level higher than the uppermost said tubular member thereby embedding the tubular members into said foam and after hardening of the foam cutting out from the formed foam block, foam coated rod-like elements each containing embedded therein one said tubular member.

BRIEF DESCRIPTION OF THE DRAWING

Further features and advantages will be more apparent from the description of a preferred, though not exclusive, embodiment of a rod-like element particularly for supporting pot-grown plants, illustrated by way of example and not of limitation in the accompanying drawing, where:

FIG. 1 is a perspective view of the tubular member;

FIG. 2 is a perspective view of the rod-like element according to the invention;

FIG. 3 depicts the rod-like element as installed in a pot;

FIG. 4 is an enlarged scale longitudinal section view of the connecting area of two rod-like elements.

FIG. 5 is a lateral elevation in diagrammatic representation of a tank for the manufacture of foam coated rod-like elements, with uncoated rod-like elements arranged therein; for space requirements the representation has been broken in the middle.

FIG. 6 is a front view of a front wall of the tank without the rod-elements, in a different scale;

FIG. 7 is a perspective view of a shaped bracket member for supporting the tubular rod-like element within the tank, shown in enlarged scale; and FIG. 8 is a cross-section according to line VIII—VIII of FIG. 7.

DESCRIPTION OF THE PREFERRED EMBODIMENTS

With reference to the cited figures, the rod-like element 1 for supporting pot-grown plants comprises a tubular member, comprised of a tube 2 preferably made of a rigid plastic material, formed at its surface with a plurality of through holes 3. The through holes 3 may be formed directly during the extrusion process, thus avoiding the need for a further processing step.

An outer coating 4 is provided around the tube 2 which is made of expanded plastics. The coating 4 is preferably formed from hydrophile foams effective to absorb water and retain it in open cells; among the materials that may be utilized the following may be mentioned, by way of example, and not of limitation: expanded polyurethane, preferably of the soft variety, expanded latex, flexible expanded polyester and the like.

Various methods may be used to apply the coating 4 to the tube 2, among which: casting of the plastic material into a box containing a plurality of tubes 2 spaced apart and parallel to each other, followed by the expansion of the plastic material which thus incorporates the tubes 2 disposed in the box; furthermore, the coating 4 may be applied by a molding process around each tube 2, or possibly applied by spraying the plastic material around the tube 2.

It is preferable to confer a green colour to the plastic material, such as to make the rod-like elements 1 thus obtained absolutely similar to those made up with natural moss; moreover it is preferable, as set forth above, to use open cell plastic materials which have better water retaining properties. Another refinement that may be adopted is to make the coating outer surface rough such that, in addition to making it still more similar to the rod-like elements wrapped in moss, a better hold is offered to the plant aerial roots.

A filler 5 is provided inside the tube 2, also made of expanded plastics or possibly of broken up residues and fragments from the plastic material utilized for the outer coating 4. Among the plastic materials that may be used for the filler 5, in addition to those already cited for the outer coating 4, open cell rigid phenol resin may be quoted.

The inventive rod-like element provides, moreover, for the possibility, when the plant growth requires it, of extending it; in fact, it is enough that in the top end of the tube 2 of the rod-like element 1 to be lengthened the bottom end of the tube 2 of another rod-like element be pressure inserted, sliding it in until the two outer coatings 4 come in contact; an extended rod-like element, as shown schematically in FIG. 4, is thus obtained without leaving the junction in sight.

The inventive rod-like element is utilized by driving it into the pot in the conventional manner, and moreover, water may be poured inside the tube 2 which forms the water reserve supply for the plant, which reserve supply is abundant and capable of lasting a few weeks. The filler 5 of expanded plastics, preferably of the open cell type, is effective to retain the water, and through the holes 3 in the tube 2, delivers it gradually to the outer coating 4 and hence to the plant; furthermore, through the lower end of the tube 2, the water may also pass to the earth in the pot. In this manner, it becomes possible to provide the plant with a considerable amount of water which is passed to the plant gradually, such as to replace, and even improve, the function usually performed by the cited accessories.

To the above, it should be added that the expanded plastic material is inert and does not damage the plant; moreover, it is rot-proof, oderless, and impervious to weak acids, such as fertilizers and disinfectants.

The embedding of the tube 2 of plastics into the foam so as to obtain a kind of incorporation of the foam into the tube i.e. an inseparable coating of foam onto the tube is achieved by the following method.

A plurality of tubes 2 are arranged in spaced parallel relationship to each other into a tank the interior of which defines a mold cavity. The tubes may be arranged either in vertical or in horizontal position or even in an inclined position if desired or required by the space availability conditions. In the embodiment shown in FIG. 5 the tubes are arranged in horizontal position the tank 6 having a bottom wall 7, lateral walls 8, a front wall 9 and a rear wall 10. It will be appreciated that wall 9 confronts the opened extremities of the tubes 2. In the embodiment shown and best visible in FIG. 6 only three tubes 2 in each vertical plane and four tubes 2 in each horizontal plane have been shown, but it is evident that the number of parallel tubes may be increased according to requirements. At least the rear wall 10 is detachably connected to the remaining adjacent walls of the tank, for purposes later described. The rear wall has a series of holes 11 having a diameter slightly greater then the diameter of the tubes 2 and adapted to receive the rear ends of such tubes. The length of the tank is slightly less than the length of the tubes so that a portion of the tubes remains outside the tank at the rear wall 10 thereof.

The length of the tubes may vary according to requirements. At present the standard lengths are of 50 cm, 95 cm, 120 cm and 175 cm. The length of the tubes projecting outside the rear wall, which remains uncoated is between 12 and 22 cm. Such uncoated portion is destined, in use, to be driven into the soil. On the front wall 9 shaped projections 12 aligned with the holes 11 are provided on the inside thereof for supporting the tubes 2. The projections have a shaped star-like cross-section preferably in the form of the letter "Y" (FIG. 5), the size of the "Y" adjacent the wall 9 being greater than the size thereof at the free end of the projections 12 thereby to form a step 13 on each wing of the "Y" performing the function of a spacer for the tubes 2, to provide a clearance between the tubes 2 and the wall 9 for the purpose described later.

In the tank 6 with the tubes 2 placed in position therein as shown in the drawing synthetic foam forming chemicals constituting a foamable thermosetting resin reaction mixture are cast in a quantity such that after expansion the level of the foam exceeds by about 4 or 5 cm the level of the uppermost tube 2 in the tank so that all tubes are completely embedded in the foam. At the end of the tubes 2 supported by the projections 12 by virtue of the spaced arrangement in respect of the wall 9 foam penetrates into the interior of the tubes through the clearance 14 provided by the shaped configuration of the projections 12, as clearly visible in FIG. 6. In this way also an end portion of the interior of the tubes 2 is coated with the foam, which surrounds continuously the edges of the tube end. In this way the adherence of the foam to the tube is additionally increased and peeling thereof from the tubes is additionally prevented.

It has been found in fact, that in addition of having a strong adherence between the tube surface and the foam it is necessary that the foam has not only an open cell structure, but also an irregular open cell structure. It has been in fact found that the irregular nature of the open cell structure better simulates the natural conditions for the plants, which better grow, take root and cling on an irregular open cell structure. Also from an aesthetical point of view natural moss is better simulated with an irregular open cell structure. It was therefore necessary to find out a synthetic foam material, which will on the one hand provide an irregular open cell structure and on the other hand perfectly adhere to the surface of the tubes. However the difficulty in such case arises from the fact that, while foams should strongly adhere to the tubes, it should not adhere to the walls of the tank in order to allow extraction from the tank after hardening of the foam.

It has been found that the above requirements may be obtained by polyurethane foam obtained as follows, all parts being by weight.

About 30 parts of a glycerin based polyether polyol sold by the Italian Company Montedison of Milan, Italy, under the trademark "Glendion" QG 50-60 are mixed at a temperature of preferably less than 18° C. with about 0.45 parts of triethanolamine, about 0.04 parts of dimethylethanolamine, about 1.9 parts of water mixed with 2.25 parts of freon 11 (trichlorofluoromethane). About 1 part of the so obtained polyol formulation is mixed in a mixer at a temperature of about 22°–23° C. with about 0.55 parts of MDI (diphenylmethane diisocyanate) and conducted to a foam applicator and from there cast into the tank 9 where the mixture rapidly (a few seconds) expands up to a preestablished level, as above described, taking into account that the volume of the expanded foam is about 30 times the volume of the non expanded liquid mixture. The mixture forms an open-cell foam.

It has been found that, when using tubes 2 made of polyvinylchloride a strong and permanent adherence between the above identified polyurethane foam and the tube will occur so that practically the foam becomes incorporated into the tube.

In order to prevent adherence between the polyurethane foam and the walls of the tank such walls are coated with a layer of polyethylene and/or polypropylene, since the above polyurethane foam does not adhere to the latter materials. The same applies also to the edges of holes 11 and supports 12, which also are coated with polyethylene and/or polypropylene.

After the hardening of the foam onto the tubes 2 within the tank 6, at least the rear wall 10 of the tank 6 and preferably also the lateral walls 8 are removed so that a block of foam with the tubes 2 embedded therein may be easily extracted from the tank 6. The rigid foam is than cut parallel to the tubes 2 at a distance therefrom with a cutting device having a plurality of cutting blades according to vertical or horizontal planes to obtain slabs which are again cut with a multiple blade cutting device to obtain prismatic rod-like foam coated elements with an octangular cross-section, the octangular cross-sectional shape being obtained by chamfering or trimming with a mill the corner edges of the square cross-section obtained during vertical and horizontal cutting-out of the rod-like elements.

The foam obtained with the above method has an irregular open cell structure hydrophilic in character and a strong adherence to the tubular member of polyvinylchloride embedded therein.

From the above description, it appears that the invention fully achieves its objects, and specifically it is pointed out the fact that the inventive rod-like element allows the elimination of the conventional moss as well as of the accessory items, thereby a compact and functional element is offered. Furthermore, it should be nothed that the rod-like element according to the invention may be extended as the plant grows, which was not possible with the prior art supporting elements.

The invention as such is susceptible to many modifications and variations, all of which fall within the scope of the present inventive concept.

Moreover, all the details, as well as the manufacturing methods, may be any ones to suit specific requisites.

I claim:

1. A method of manufacture of foam coated rod-like elements for supporting pot-grown plants, comprisng the steps of:

horizontally placing into an empty mold cavity and at a distance from each other parallel elongated hollow tubular members leaving interspaces between said tubular members extending all along the tubular member, the tubular members having each at least one open ended extremity, and the mold cavity having walls confronting said open ended extremities attaching at least one of the opposite ended extremities of each tubular member to the confronting wall of the mold cavity leaving a clearance between said confronting wall and the open ended extremity of said tubular members to thereby provide passage between said extremity and the confronting wall introducing a foamable thermosetting resin reaction mixture into said mold cavity, and leaving the foam formed from said mixture to expand all around said tubular members and to pass through said clearances partially into the interior of said tubular members, thereby to obtain a foam block in which said tubular members are embedded and wherein the foam partially extends into the interior of the tubular members, after hardening of the foam extracting the tubular members containing foam block from the mold cavity and cutting said foam block thus obtained into rectangular foam blanks each having a tubular member in its center and trimming the corners of said rectangular blanks so as to give the required shape to the obtained foam coated rod-like elements.

2. A method according to claim 1, wherein one end portion of said tubular members is arranged to extend outside said mold cavity thereby to leave said end portion uncoated.

3. A method according to claim 1, wherein the step of introducing said foamable thermosetting resin reaction mixture into said mold cavity is subsequent to the preparation of said mixture such preparation comprising the step of mixing 30 parts by weight of a glycerin based polyether polyol with 0.45 parts by weight of triethanolamine, 0.04 parts by weight of dimethylethanolamine, from 1.9 to 2.25 parts of a mixture of water and trichlorofluoromethane 11 to obtain a formulated polyol and mixing 1 part by weight of such formulated polyol with 0.55 parts by weight of diphenylmethane diisocyanate to obtain said foamable reaction mixture to be introduced into said mold cavity and suitable to form an open-cell foamed polyurethane resin product.

* * * * *